(12) United States Patent
Tsubota

(10) Patent No.: US 8,897,650 B2
(45) Date of Patent: Nov. 25, 2014

(54) SENDING/RECEIVING SYSTEM, SENDING/RECEIVING METHOD, AND NON-TRANSITORY COMPUTER-READABLE MEDIUM

(75) Inventor: Hirokazu Tsubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 190 days.

(21) Appl. No.: 13/589,376

(22) Filed: Aug. 20, 2012

(65) Prior Publication Data

US 2013/0177324 A1 Jul. 11, 2013

(30) Foreign Application Priority Data

Jan. 6, 2012 (JP) .................................. 2012-001220

(51) Int. Cl.
*H04B 10/00* (2013.01)
*H04B 10/12* (2006.01)
*H04K 1/10* (2006.01)
*H04L 27/28* (2006.01)

(52) U.S. Cl.
USPC ............ 398/140; 398/151; 398/150; 375/260

(58) Field of Classification Search
CPC .................... B60L 2200/30; B62B 2202/404; B62B 5/0026; H04B 10/25
USPC .......................................... 398/140; 375/260
See application file for complete search history.

(56) References Cited

U.S. PATENT DOCUMENTS

| | | | | |
|---|---|---|---|---|
| 4,310,922 A | * | 1/1982 | Lichtenberger et al. | ...... 370/306 |
| 4,388,683 A | * | 6/1983 | Beifuss et al. | ................. 710/106 |
| 5,357,608 A | * | 10/1994 | Bartow et al. | ................. 709/227 |
| 5,426,644 A | * | 6/1995 | Fujimoto | ....................... 370/535 |
| 5,481,738 A | * | 1/1996 | Bartow et al. | .................. 709/220 |
| 5,898,512 A | * | 4/1999 | Arai | ............................. 398/30 |
| 6,173,190 B1 | * | 1/2001 | Usui | ........................... 455/562.1 |
| 6,914,637 B1 | * | 7/2005 | Wolf et al. | ..................... 348/473 |
| 7,248,587 B1 | * | 7/2007 | Sharma | ......................... 370/394 |
| 7,286,570 B2 | * | 10/2007 | Kendall et al. | ................ 370/535 |
| 7,730,376 B2 | * | 6/2010 | Das Sharma | ................... 714/742 |
| 7,843,458 B2 | * | 11/2010 | Cantin | .......................... 345/520 |
| 2001/0011312 A1 | * | 8/2001 | Chu | ................................. 710/64 |
| 2003/0112798 A1 | * | 6/2003 | Ziegler et al. | ................. 370/366 |
| 2004/0068600 A1 | * | 4/2004 | Cranford et al. | .............. 710/300 |
| 2005/0034009 A1 | * | 2/2005 | Sutardja et al. | ............... 713/503 |
| 2005/0063378 A1 | * | 3/2005 | Kadous | .......................... 370/389 |
| 2005/0157781 A1 | * | 7/2005 | Ho et al. | ........................ 375/233 |

(Continued)

FOREIGN PATENT DOCUMENTS

JP 2005-277827 A 10/2005

*Primary Examiner* — Ken Vanderpuye
*Assistant Examiner* — Abbas H Alagheband
(74) *Attorney, Agent, or Firm* — Sughrue Mion, PLLC

(57) ABSTRACT

A sending/receiving system includes first and second sending/receiving apparatuses. The first sending/receiving apparatus includes a first sending section that sends link establishment information via first transmission channels. The second sending/receiving apparatus includes a second sending section, link establishing sections, and a controller. The second sending section sends link establishment information to the first sending/receiving apparatus via a second transmission channel. Each of the link establishing sections is provided for a corresponding one of the first transmission channels and establishes a link in the corresponding first transmission channel on the basis of the link establishment information. When links have been established in all of the first transmission channels by the link establishing sections, the controller causes the second sending section to send the link establishment information in order to cause the first sending/receiving apparatus to establish a link in the second transmission channel.

4 Claims, 8 Drawing Sheets

(56) References Cited

U.S. PATENT DOCUMENTS

| | | | |
|---|---|---|---|
| 2005/0169308 A1* | 8/2005 | Hashi et al. | 370/469 |
| 2005/0213596 A1* | 9/2005 | Mizutani | 370/431 |
| 2005/0220207 A1* | 10/2005 | Perlman et al. | 375/267 |
| 2005/0259692 A1* | 11/2005 | Zerbe | 370/503 |
| 2006/0008276 A1* | 1/2006 | Sakai et al. | 398/141 |
| 2006/0029006 A1* | 2/2006 | Oster | 370/299 |
| 2006/0123163 A1* | 6/2006 | Kawanishi | 710/58 |
| 2006/0166625 A1* | 7/2006 | Ito et al. | 455/69 |
| 2007/0002939 A1* | 1/2007 | Daugherty | 375/219 |
| 2007/0150762 A1* | 6/2007 | Sharma et al. | 713/300 |
| 2008/0013635 A1* | 1/2008 | Dupuis | 375/258 |
| 2008/0022179 A1* | 1/2008 | Lee | 714/748 |
| 2008/0076478 A1* | 3/2008 | Russell et al. | 455/562.1 |
| 2008/0273647 A1* | 11/2008 | Segaram | 375/371 |
| 2010/0097249 A1* | 4/2010 | Tsubota et al. | 341/100 |
| 2010/0254704 A1* | 10/2010 | Aoki | 398/45 |
| 2011/0004713 A1* | 1/2011 | Tsubota | 710/107 |
| 2011/0019762 A1* | 1/2011 | Tsubota | 375/295 |
| 2011/0196910 A1* | 8/2011 | Akamatsu et al. | 709/201 |
| 2012/0069843 A1* | 3/2012 | Tsubota | 370/389 |
| 2012/0092694 A1* | 4/2012 | Tsubota | 358/1.14 |

\* cited by examiner

US 8,897,650 B2

SENDING/RECEIVING SYSTEM, SENDING/RECEIVING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-001220 filed Jan. 6, 2012.

BACKGROUND (i) Technical Field

The present invention relates to a sending/receiving system, a sending/receiving method, and a non-transitory computer-readable medium.

(ii) Related Art

In recent years, data transmission using high-speed serial transmission techniques has been frequently used. The reason for this is that the data transmission amount of data transmitted between an image forming apparatus and an image processing apparatus has markedly increased as image quality has increased. The data transmission amount is expected to further increase in the future. Accordingly, data transmission has been increasingly used with a configuration in which a bandwidth is guaranteed by increasing the transmission frequency of a serial transmission channel so as to increase the data transmission amount or by using multiple serial transmission channels.

SUMMARY

According to an aspect of the invention, there is provided a sending/receiving system including a first sending/receiving apparatus and a second sending/receiving apparatus. The first sending/receiving apparatus includes a first sending section that serially sends link establishment information via multiple first transmission channels. The link establishment information is used to establish a link. The second sending/receiving apparatus includes a second sending section, multiple link establishing sections, and a controller. The second sending section serially sends link establishment information to the first sending/receiving apparatus via a second transmission channel. The link establishment information is used to establish a link. Each of the multiple link establishing sections is a section that is provided for a corresponding one of the multiple first transmission channels and that establishes a link in the corresponding first transmission channel on the basis of the link establishment information which has been sent from the first sending section of the first sending/receiving apparatus. When links have been established in all of the multiple first transmission channels by the multiple link establishing sections, the controller causes the second sending section to send the link establishment information in order to cause the first sending/receiving apparatus to establish a link in the second transmission channel.

BRIEF DESCRIPTION OF THE DRAWINGS

Exemplary embodiments of the present invention will be described in detail based on the following figures, wherein.

DETAILED DESCRIPTION

Figure 1:
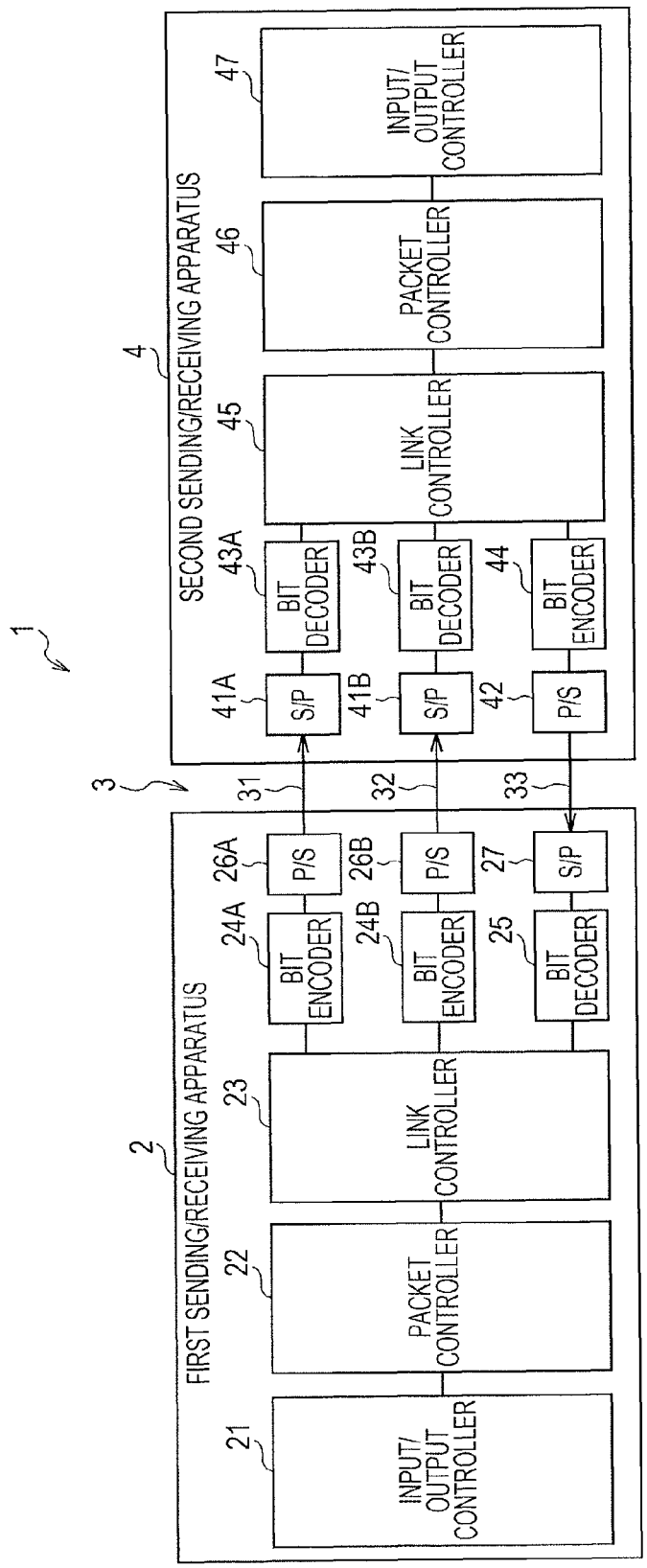
FIG. 1 is a block diagram illustrating an example of a configuration of a sending/receiving system according to a first exemplary embodiment of the present invention.

Hereinafter, exemplary embodiments of the present invention will be described with reference to the accompanying drawings. Note that, in the individual drawings, elements having substantially the same functions are denoted by the same reference numerals, and a duplicate description thereof is omitted.

First Exemplary Embodiment

FIG. 1 is a block diagram illustrating an example of a configuration of a sending/receiving system according to a first exemplary embodiment of the present invention. A sending/receiving system 1 is a system in which a first sending/receiving apparatus 2 and a second sending/receiving apparatus 4 are connected via a transmission channel 3 that is used to serially send and receive information. The transmission channel 3 includes a first lane 31, a second lane 32, and a third lane 33. Here, the first and second lanes 31 and 32 correspond to multiple first transmission channels, and the third lane 33 corresponds to a second transmission channel.

Configuration of First Sending/Receiving Apparatus

The first sending/receiving apparatus 2 includes an input/output controller 21, a packet controller 22, a link controller 23, bit encoders 24A and 24B, a bit decoder 25, parallel/serial converters (P/S) 26A and 26B, and a serial/parallel converter (S/P) 27. The bit encoder 24A and the bit encoder 24B are provided so as to correspond to the first lane 31 and the second lane 32, respectively, and the bit decoder 25 is provided so as to correspond to the third lane 33. The parallel/serial converter 26A and the parallel/serial converter 26B are provided so as to correspond to the first lane 31 and the second lane 32, respectively, and the serial/parallel converter 27 is provided so as to correspond to the third lane 33. Note that the parallel/serial converters 26A and 26B are examples of a first sending section that sends link establishment information which is used to establish a link. The serial/parallel converter 27 is an example of a receiving section that receives link establishment information and a link establishing section that establishes a link in the third lane 33.

Configuration of Second Sending/Receiving Apparatus

The second sending/receiving apparatus 4 includes serial/parallel converters (S/P) 41A and 41B, a parallel/serial converter (P/S) 42, bit decoders 43A and 43B, a bit encoder 44, a link controller 45, a packet controller 46, and an input/output controller 47. The serial/parallel converter 41A and the serial/parallel converter 41B are provided so as to correspond to the first lane 31 and the second lane 32, respectively, and the parallel/serial converter 42 is provided so as to correspond to the third lane 33. The bit decoder 43A and the bit decoder 43B are provided so as to correspond to the first lane 31 and the second lane 32, respectively, and the bit encoder 44 is provided so as to correspond to the third lane 33. The serial/parallel converters 41A and 41B are examples of receiving sections that receive link establishment information and link establishing sections that establish links in the first and second lanes 31 and 32. The parallel/serial converter 42 is an example of a second sending section that sends link establishment information.

Transmission Channel

In the present exemplary embodiment, regarding the data transmission amount of data transmitted to an apparatus serving as a partner, the data transmission amount of the first sending/receiving apparatus 2 is larger than that of the second sending/receiving apparatus 4. Accordingly, the first and second lanes 31 and 32 are used for transmission from the first sending/receiving apparatus 2 to the second sending/receiving apparatus 4 (used for a downward direction), and the third lane 33 is used for transmission from the second sending/receiving apparatus 4 to the first sending/receiving apparatus 2 (used for an upward direction). Thus, the first sending/receiving apparatus 2 sends, to the second sending/receiving apparatus 4 via the first and second lanes 31 and 32, image information that has been reproduced by, for example, a reproduction apparatus that is not illustrated. The second sending/receiving apparatus 4 outputs the image information, which has been sent from the first sending/receiving apparatus 2, to, for example, an image display apparatus that is not illustrated, and sends status information to the first sending/receiving apparatus 2 via the third lane 33.

An electric cable through which electric signals are transmitted or an optical cable through which optical signals are transmitted may be used as the transmission channel 3. In the present exemplary embodiment, an electric cable is used. Each of the first lane 31, the second lane 32, and the third lane 33 included in the transmission channel 3 is constituted by two lines, and may be constituted by differential lines through which differential signals are transmitted. Note that the number of lanes included in the transmission channel 3 is not limited to that in the present exemplary embodiment. The number of lanes used for the upward direction and the number of lanes used for the downward direction may be the same. Alternatively, the number of lanes used for the downward direction may be larger than that used for the upward direction.

Configuration of Each of Sections of the First and Second Sending/Receiving Apparatuses The input/output controller 21 of the first sending/receiving apparatus 2 sends/receives data to/from, for example, a reproducing apparatus. The input/output controller 47 of the second sending/receiving apparatus 4 sends/receives data to/from, for example, an image display apparatus.

For the direction (the downward direction) from the first sending/receiving apparatus 2 to the second sending/receiving apparatus 4, the packet controller 22 of the first sending/receiving apparatus 2 packetizes data in order to perform serial data transmission. For the direction (the upward direction) from the second sending/receiving apparatus 4 to the first sending/receiving apparatus 2, the packet controller 22 extracts data from packetized data. For the downward direction, the packet controller 46 of the second sending/receiving apparatus 4 extracts data from packetized data, and, for the upward direction, packetizes data in order to perform serial data transmission.

The link controller 23 of the first sending/receiving apparatus 2 sets initial settings for the parallel/serial converters 26A and 26B and the serial/parallel converter 27 when the power of the first sending/receiving apparatus 2 is turned on, and performs link control in the case where serial transmission is performed between the first sending/receiving apparatus 2 and the second sending/receiving apparatus 4. The link controller 45 of the second sending/receiving apparatus 4 sets initial settings for the serial/parallel converters 41A and 41B and the parallel/serial converter 42 when the power of the second sending/receiving apparatus 4 is turned on, and performs link control in the case where serial transmission is performed between the first sending/receiving apparatus 2 and the second sending/receiving apparatus 4. In the case where the initial settings are set, the link controllers 23 and 45 are configured so as not to output link establishment information used for link control.

Figure 2:
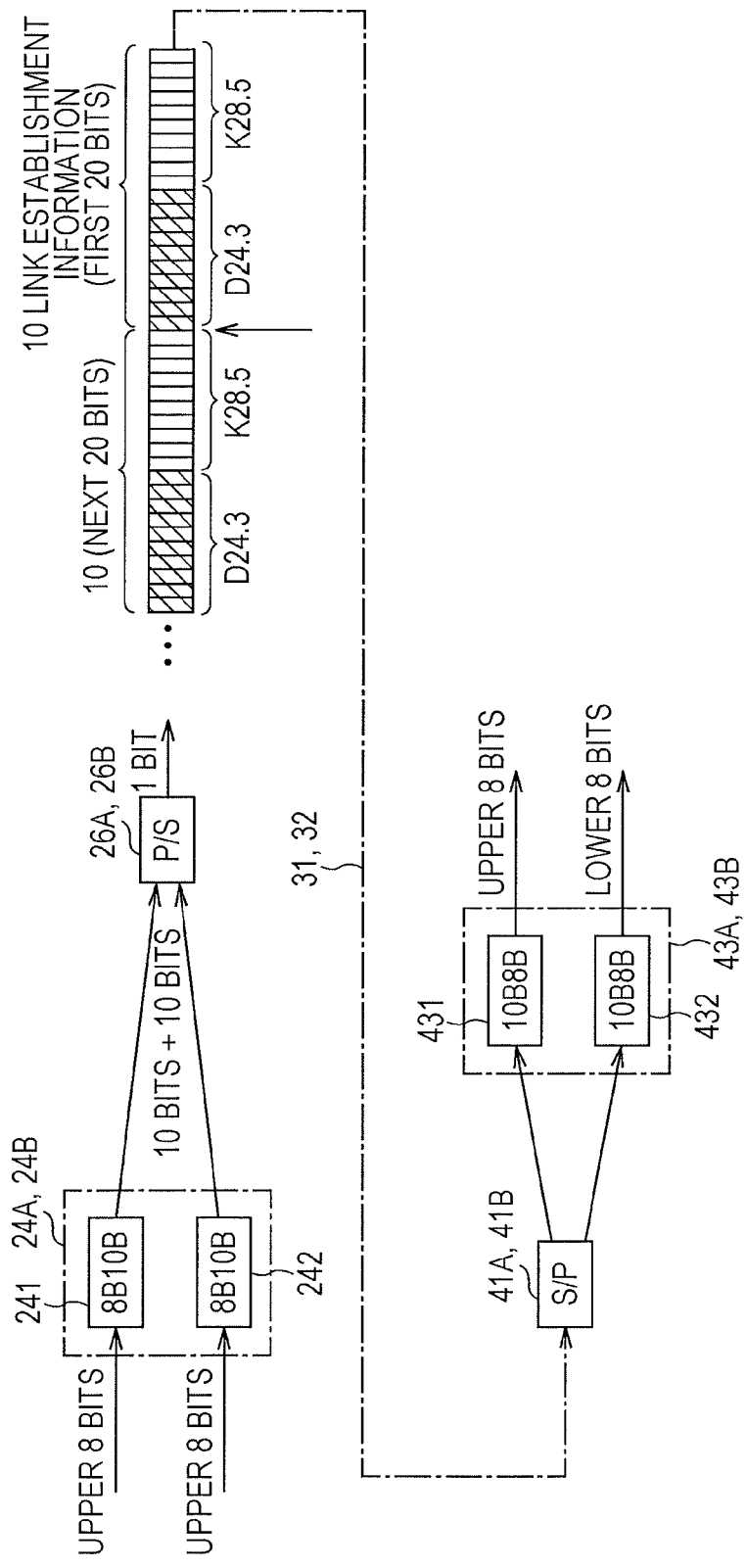
FIG. 2 is a diagram for explaining establishment of a link.

Each of the bit encoders 24A and 24B of the first sending/receiving apparatus 2 and the bit encoder 44 of the second sending/receiving apparatus 4 has a pair of 8B/10B encoders (8B10B) 241 and 242 that perform 8B/10B encoding in which, among 16 bits, the upper 8 bits are encoded into 10 bits and the lower 8 bits are encoded into 10 bits as illustrated in FIG. 2 described below. Each of the bit decoders 43A and 43B of the first sending/receiving apparatus 2 and the bit decoder 25 of the second sending/receiving apparatus 4 has a pair of 10B/8B decoders (10B8B) 431 and 432 that perform 10B/8B decoding in which, among 20 bits, the upper 10 bits are decoded into 8 bits and the lower 10 bits are decoded into 8 bits. 8B/10B encoding is performed in order to adjust DC balance so that an appropriate number of 0s and an appropriate number of 1s are included in transmitted data. In a method known as 8B10B encoding, each of data blocks in units of 8 bits is encoded into 10-bit data which is determined advance and in which the ratio of the number of 0s to the number of 1s close to 50%, thereby adjusting DC balance.

Each of the parallel/serial converters 26A and 26B of the first sending/receiving apparatus 2 and the parallel/serial converter 42 of the second sending/receiving apparatus 4 performs conversion (P/S conversion) from parallel data into serial data, and has registers. In the registers, settings for a de-emphasis in which DC components of a signal waveform are attenuated, settings for a pre-emphasis in which high-frequency components of a signal waveform are emphasized, a differential voltage, and so forth are set as initial settings when the power of a corresponding one of the first and second sending/receiving apparatuses 2 and 4 is turned on. A function of performing P/S conversion and S/P conversion is referred to as a "serializer/deserializer (SerDes) function".

Each of the serial/parallel converter 27 of the first sending/receiving apparatus 2 and the serial/parallel converters 41A and 41B of the second sending/receiving apparatus 4 performs conversion (S/P conversion) from serial data into parallel data, and has registers. In the registers, settings for an equalizer that performs correction for deterioration of a signal waveform in the transmission channel 3, and so forth are set as initial settings when the power of a corresponding one of the first and second sending/receiving apparatuses 2 and 4 is turned on.

Regarding the sections, such as the input/output controller 21 and the serial/parallel converters 41A and 41B, included in the first and second sending/receiving apparatuses 2 and 4, some or all of the sections are configured using a hardware circuit, such as reconfigurable circuit (a field programmable gate array (FPGA)), an application specific integrated circuit (ASIC), or a dedicated large scale integrated (LSI) circuit. Alternatively, a central processing unit (CPU) may operate in according with a program in each computer, whereby the sections, such as the input/output controller 21 and the serial/parallel converters 41A and 41B, included in the first and second sending/receiving apparatuses 2 and 4 may be realized.

Establishment of Link

Here, regarding establishment of a link, a case where links are established in the first and second lanes 31 and 32 will be described with reference to FIG. 2. A SERDES function may be used, in which the bit width of a parallel part can be selected from the alternatives, such as 10 bits, 20 bits, and 36 bits. For example, in the case where the bit width is set to 16 bits for such a SERDES function to be used, in each of the bit encoders 24A and 24B, 16 bits are encoded into 20 bits by the two 8B/10B encoders 241 and 242. Then, the 20 bits are divided into individual bits by a corresponding one of the parallel/serial converters 26A and 26B. In this case, 20 bits constituted by the individual bits are treated as one block. In the case where establishment of a link is performed, data represented by K28.5(10 bits)+D24.3(10 bits) is repeatedly sent as link establishment information from a sending side, thereby making a request to establish a link. On a receiving side, the individual bits are grouped in units of 10 bits by each of the serial/parallel converters 41A and 41B, thereby obtaining 10 bits and 10 bits. The 10 bits and 10 bits are decoded into upper 8 bits and lower 8 bits by the 10B/8B decoder 431 and the 10B/8B decoder 432, respectively, of a corresponding one of the bit decoders 43A and 43B. Each of the serial/parallel converters 41A and 41B on the receiving side compares received data with the data represented by K28.5+D24.3, and finds the first one of positions at which the received data matches the data represented by K28.5+D24.3 (a boundary between the first 20 bits and the next 20 bits, which is indicated by the arrow in FIG. 2), (thereby performing alignment adjustment). Each of the serial/parallel converters 41A and 41B performs data synchronization control or the like on the basis of the positions at which the received data matches the data represented by K28.5+D24.3, thereby establishing a link.

Note that the link establishment information is not limited to K28.5+D24.3 mentioned above. For example, another K code or another D code may be used. D24.3+K28.5 that is obtained by exchanging the K code and the D code may be used. Alternatively, a K code or a D code may be used alone.

Operation in First Exemplary Embodiment

Figure 3:
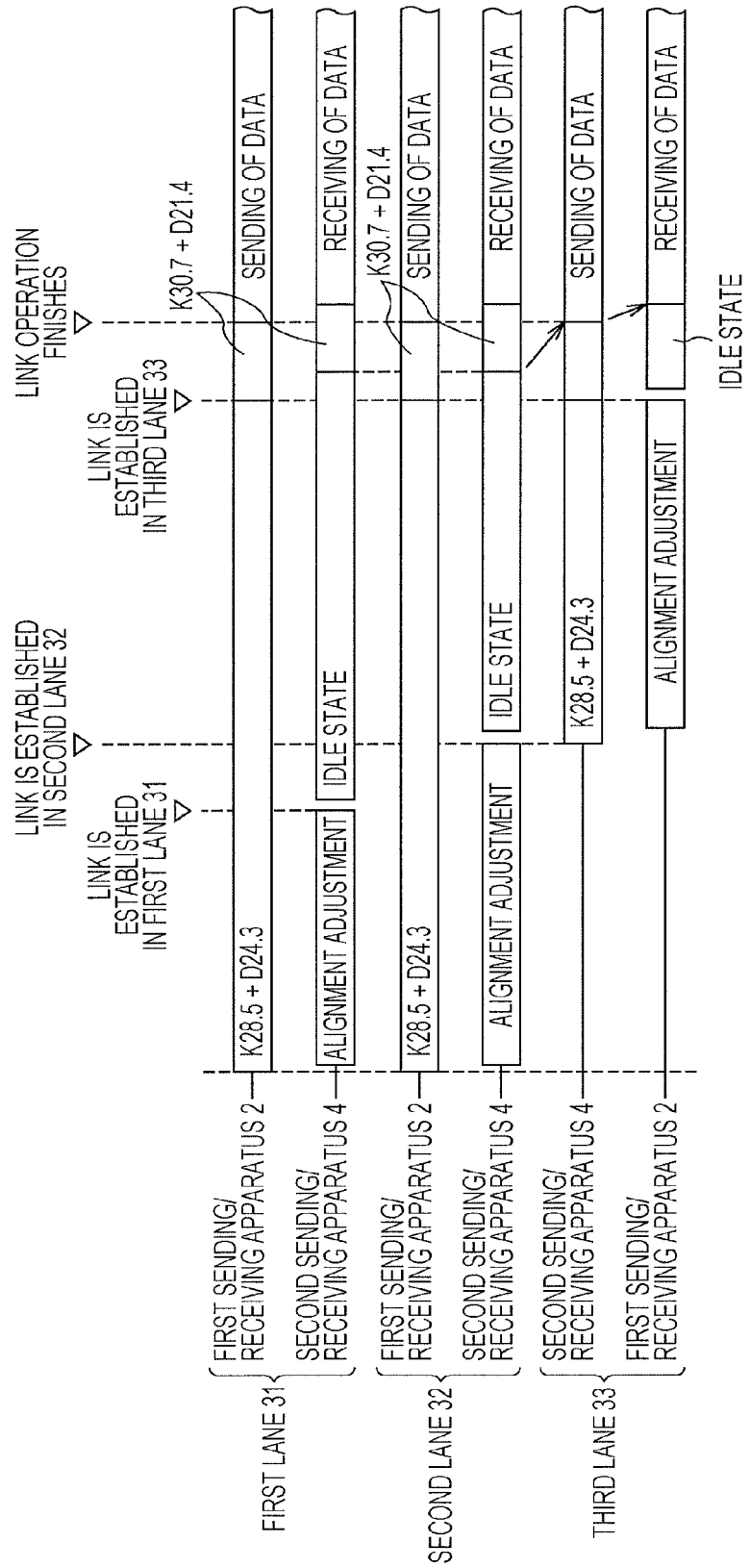
FIG. 3 is a timing chart illustrating an example of an operation of establishing links between first and second sending/receiving apparatuses in the first exemplary embodiment.
Figure 4:
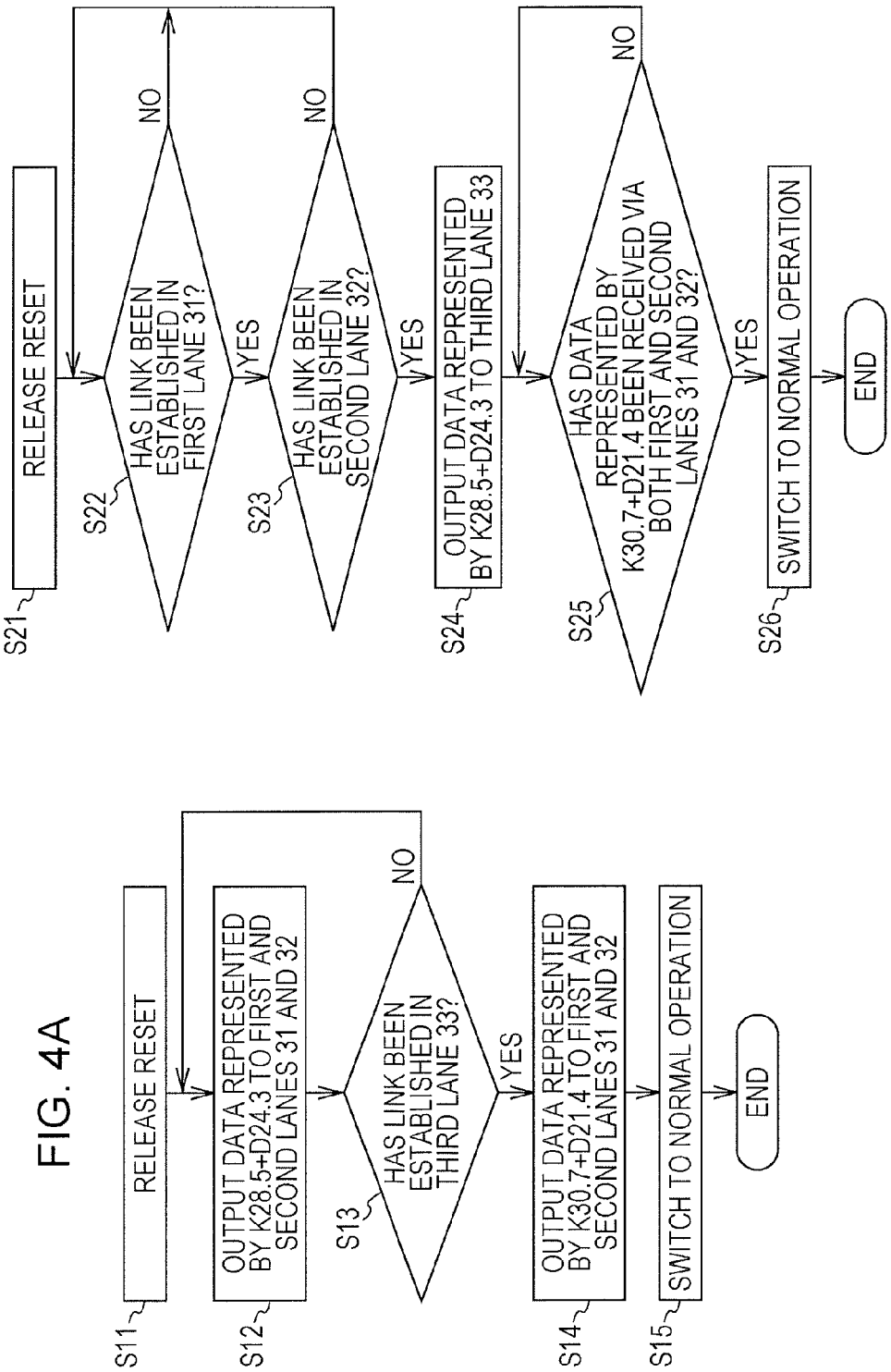
FIG. 4A is a flowchart illustrating an example of an operation of the first sending/receiving apparatus in the first exemplary embodiment.
FIG. 4B is a flowchart illustrating an example of an operation of the second sending/receiving apparatus in the first exemplary embodiment.

Next, an operation in the first exemplary embodiment will be described by following flowcharts illustrated in FIGS. 4A and 4B, with reference to FIG. 3. FIG. 3 is a timing chart illustrating an example of an operation of establishing links between the first and second sending/receiving apparatuses in the first exemplary embodiment. FIG. 4A is a flowchart illustrating an example of an operation of the first sending/receiving apparatus in the first exemplary embodiment, and FIG. 4B is a flowchart illustrating an example of an operation of the second sending/receiving apparatus in the first exemplary embodiment.

Regarding the first sending/receiving apparatus 2, after the reset thereof has been released by a reset release signal (step S11), the link controller 23 instructs the parallel/serial converters 26A and 26B to output link establishment information, e.g., data represented by K28.5+D24.3, to the first and second lanes 31 and 32 (step S12). The parallel/serial converters 26A and 26B repeatedly send the data represented by K28.5+D24.3 to the second sending/receiving apparatus 4 via the first lane 31 and the second lane 32, which correspond to the parallel/serial converters 26A and 26B, respectively, thereby making requests to establish links.

Regarding the second sending/receiving apparatus 4, after the reset thereof has been released by a reset release signal (step S21), when the serial/parallel converters 41A and 41B receive the data represented by K28.5+D24.3, as described with reference to FIG. 2, alignment adjustment is performed, and links are established (YES in step S22 and YES in step S23). When a link has been established in the first lane 31, the serial/parallel converter 41A provides, for the link controller 45, a notification saying that a link has been established. When a link has been established in the second lane 32, the serial/parallel converter 41B provides, for the link controller 45, a notification saying that a link has been established. When links have been established in the first lanes 31 and 32, the serial/parallel converters 41A and 41B enter an idle state.

When the link controller 45 receives the notifications, each of which says that a link has been established, from both the serial/parallel converters 41A and 41B, the link controller 45 instructs the parallel/serial converter 42 to output link establishment information, e.g., data by represented by K28.5+D24.3, to the third lane 33. The parallel/serial converter 42 repeatedly sends the data by represented by K28.5+D24.3 to the first sending/receiving apparatus 2 via the third lane 33, thereby making a request to establish a link (step S24).

When the serial/parallel converter 27 of the first sending/receiving apparatus 2 receives the data represented by K28.5+D24.3, alignment adjustment is performed, and a link is established (YES in step S13). When a link has been established in the third lane 33, the serial/parallel converter 27 provides, for the link controller 23, a notification saying that a link has been established. When a link has been established in the third lane 33, the serial/parallel converter 27 enters the idle state. The link controller 23 instructs the parallel/serial converters 26A and 26B to output information indicating that a link operation has finished, e.g., data represented by K30.7+D21.4, to the first and second lanes 31 and 32, respectively. The parallel/serial converters 26A and 26B repeatedly send the data represented by K30.7+D21.4 to the second sending/receiving apparatus 4 via the first lane 31 and the second lane 32, which correspond to the parallel/serial converters 26A and 26B, respectively (step S14). After that, the first sending/receiving apparatus 2 enters a normal operation, i.e., an operation of sending data (image information) (step S15).

When the serial/parallel converters 41A and 41B of the second sending/receiving apparatus 4 receive the data represented by K30.7+D21.4, the serial/parallel converters 41A and 41B provide notifications, each of which says that the link operation has finished, for the link controller 45. When the link controller 45 receives the notifications, each of which says that the link operation has finished, from both the serial/parallel converters 41A and 41B (step S25), the second sending/receiving apparatus 4 enters a normal operation, i.e., an operation of receiving data (image information) (step S26).

Figure 5:
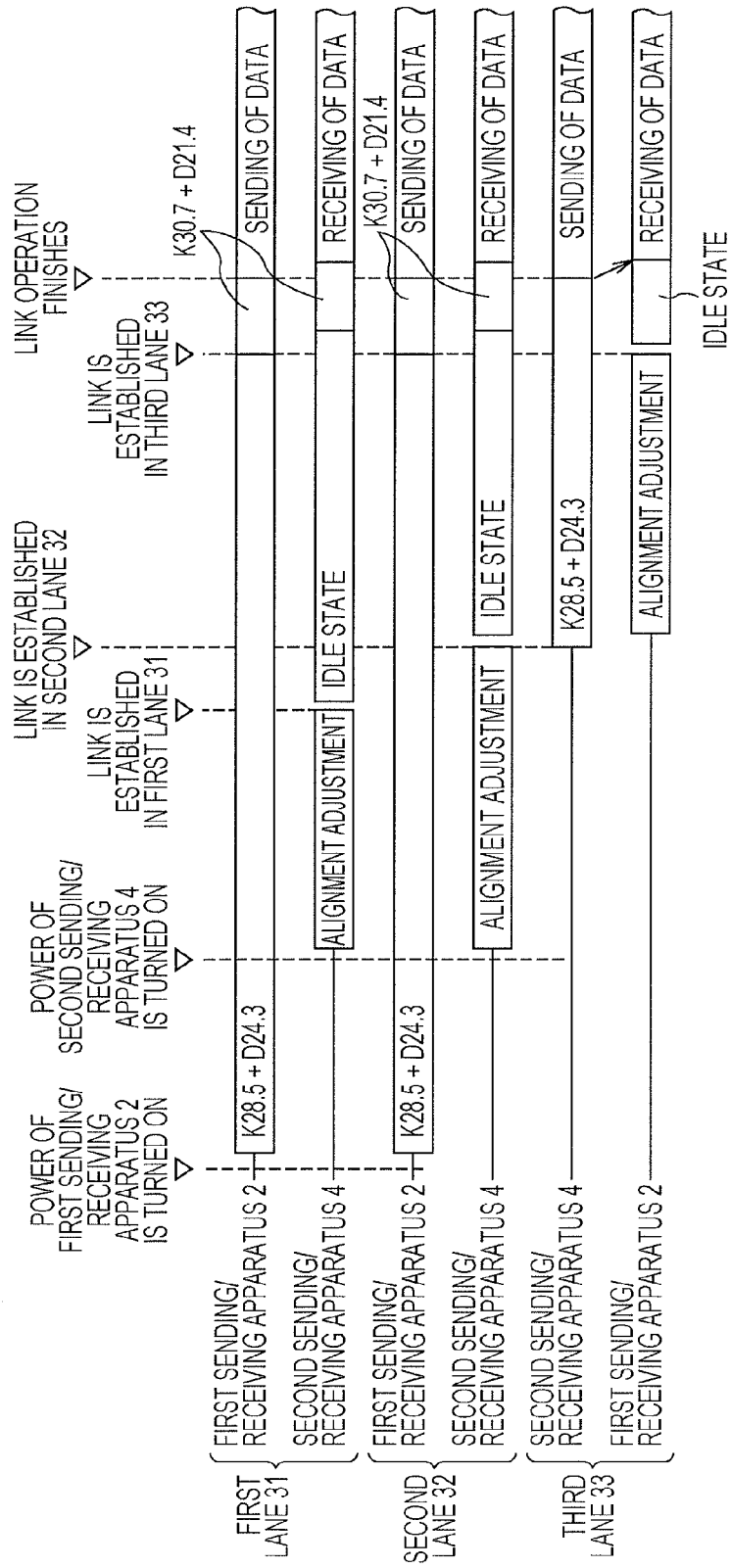
FIG. 5 is a timing chart illustrating an example of the operation of establishing links in the case where the power of the first sending/receiving apparatus is turned on earlier than the power of the second sending/receiving apparatus.

First Example in Case where there is Difference Between Times at which Power is Turn on FIG. 5 is a timing chart illustrating an example of the operation of establishing links in the case where the power of the first sending/receiving apparatus 2 is turned on earlier than the power of the second sending/receiving apparatus 4. Regarding the first sending/receiving apparatus 2, after the power thereof has been turned on, the link controller 23 sets initial settings for the parallel/serial converters 26A and 26B and the serial/parallel converter 27. After the initial settings have been set, as illustrated in FIG. 3, the link operation including, for example, sending of link establishment information is performed. Because the power of the second sending/receiving apparatus 4 has not yet been turned on at this stage, the second sending/receiving apparatus 4 is not able to perform alignment adjustment. When the power of the second sending/receiving apparatus 4 is turned on, the link controller 45 sets initial settings for the serial/parallel converters 41A and 41B and the parallel/serial converter 42. After the initial settings have been set, as illustrated in FIG. 3, the link operation including, for example, alignment adjustment is performed.

For timing at which power is turned on and which is illustrated in FIG. 5, after the power of the second sending/receiving apparatus 4 has been turned on, the link operation may be finished within a time period similar to that in the case illustrated in FIG. 3.

Figure 6:
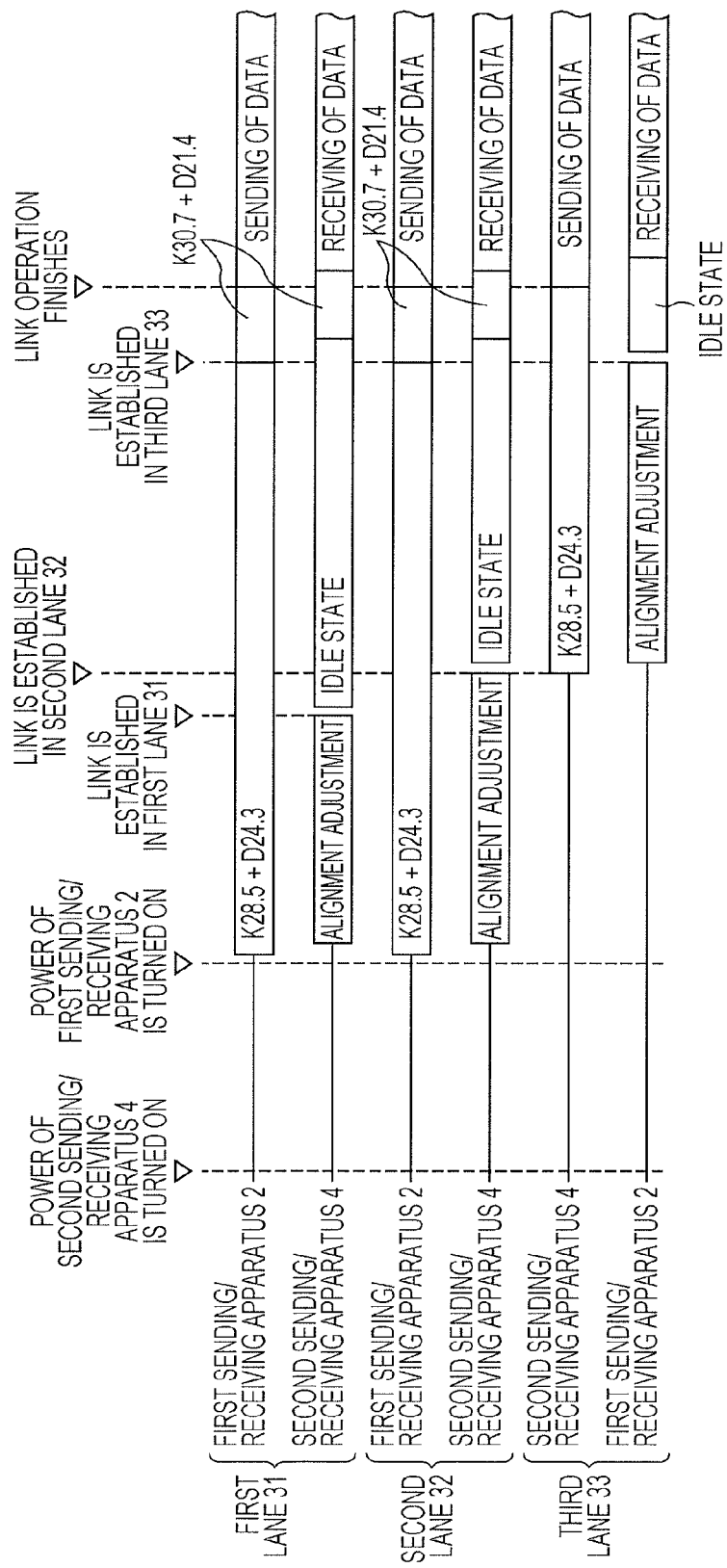
FIG. 6 is a timing chart illustrating an example of the operation of establishing links in the case where the power of the second sending/receiving apparatus is turned on earlier than the power of the first sending/receiving apparatus.

Second Example in Case where there is Difference Between Times at which Power is Turn on FIG. 6 is a timing chart illustrating an example of the operation of establishing links in the case where the power of the second sending/receiving apparatus 4 is turned on earlier than the power of the first sending/receiving apparatus 2. Regarding the second sending/receiving apparatus 4, when the power thereof is turned on, the link controller 45 sets initial settings for the parallel/serial converters 41A and 41B and the parallel/serial converter 42. Next, regarding the first sending/receiving apparatus 2, when the power thereof is turned on, the link controller 23 sets initial settings for the parallel/serial converters 26A and 26B and the serial/parallel converter 27. After the initial settings have been set, as illustrated in FIG. 3, the link operation including, for example, sending of link establishment information is performed. Because the power of the second sending/receiving apparatus 4 has already been turned on at this stage, as illustrated in FIG. 3, the operation including, for example, alignment adjustment is performed.

For timing at which power is turned on and which is illustrated in FIG. 6, after the power of the first sending/receiving apparatus 2 has been turned on, the link operation may be finished within a time period similar to that in the case illustrated in FIG. 3.

According to the first exemplary embodiment, establishment of links may be finished within a time period shorter than that in the case where a configuration in which the first and second sending/receiving apparatuses 2 and 4 simultaneously send link establishment information to each other is used.

Second Exemplary Embodiment

Figure 7:
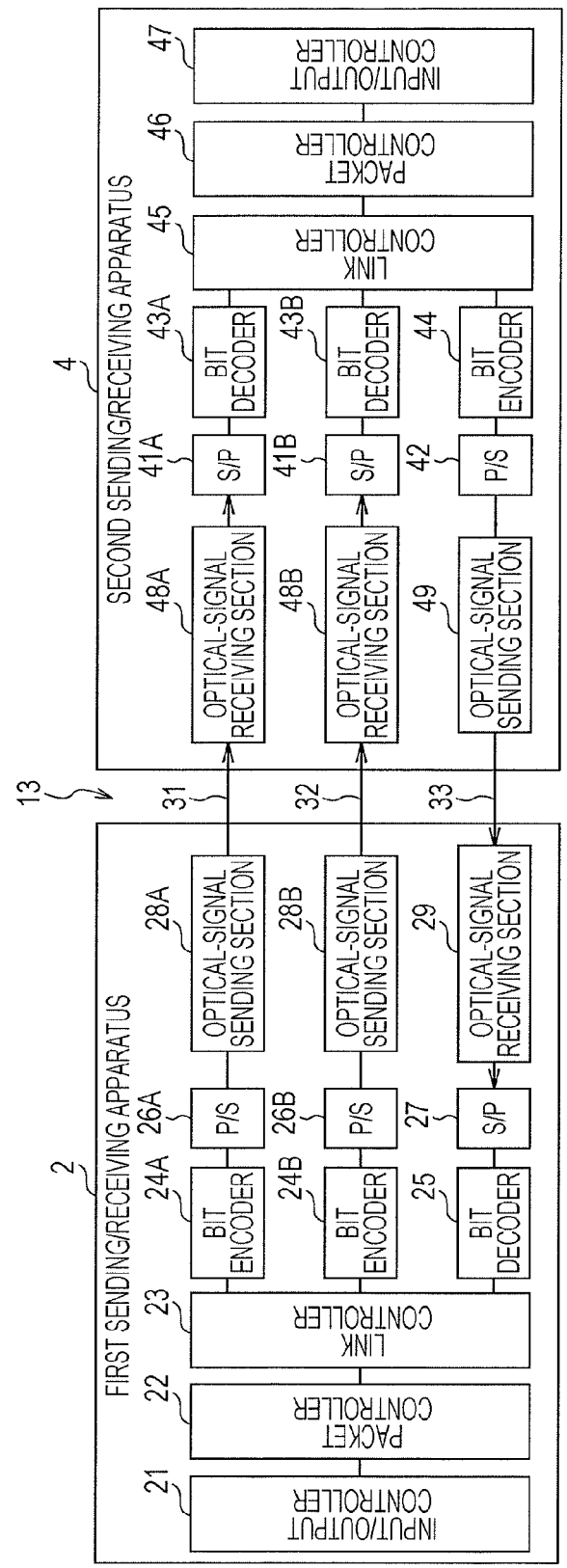
FIG. 7 is a block diagram illustrating an example of a configuration of a sending/receiving system according to a second exemplary embodiment of the present invention.

FIG. 7 is a block diagram illustrating an example of a configuration of a sending/receiving system according to a second exemplary embodiment of the present invention. Although an electric cable is used as the transmission channel 3 in the first exemplary embodiment, an optical cable is used as a transmission channel 13 in the present exemplary embodiment. Regarding an overall configuration of a sending/receiving system 1, as in the first exemplary embodiment, the sending/receiving system 1 includes a first sending/receiving apparatus 2 and a second sending/receiving apparatus 4 that is connected to the first sending/receiving apparatus 2 via the transmission channel 13 including a first lane 31, a second lane 32, and a third lane 33.

Configuration of First Sending/Receiving Apparatus

As in the first exemplary embodiment, the first sending/receiving apparatus 2 includes an input/output controller 21, a packet controller 22, a link controller 23, bit encoders 24A and 24B, a bit decoder 25, parallel/serial converters 26A and 26B, and a serial/parallel converter 27. In the present exemplary embodiment, the first sending/receiving apparatus 2 further includes optical-signal sending sections 28A and 28B that are provided so as to correspond to the first lane 31 and the second lane 32, respectively, and an optical-signal receiving section 29 that is provided so as to correspond to the third lane 33.

Each of the optical-signal sending sections 28A and 28B includes a light emitting unit, such as a laser diode (LD), and a driving unit that drives the light emitting unit, such as an LD driver. The optical-signal receiving section 29 includes a light receiving unit, such as a photo diode (PD), and an amplification unit that amplifies an output signal of the light receiving unit.

The link controller 23 controls the optical-signal sending sections 28A and 28B so that verification information is transmitted using optical signals having optical power per unit time which is smaller than optical power per unit time in the case of sending link establishment information, e.g., using optical signals that intermittently emit light, before the link establishment information is sent to the first and second lanes 31 and 32. The verification information is information that is used to verify whether or not an optical signal reaches the second sending/receiving apparatus 4 and that is different from the link establishment information. Verification information that is different from link establishment information is sent as an optical signal from the second sending/receiving apparatus 4 to the first sending/receiving apparatus 2. When the optical-signal receiving section 29 detects the verification information, the link controller 23 controls the optical-signal sending sections 28A and 28B so that link establishment information and information subsequent thereto are sent using optical signals that continuously emit light.

Configuration of Second Sending/Receiving Apparatus

As in the first exemplary embodiment, the second sending/receiving apparatus 4 includes serial/parallel converters 41A and 41B, a parallel/serial converter 42, bit decoders 43A and 43B, a bit encoder 44, a link controller 45, a packet controller 46, and an input/output controller 47. In the present exemplary embodiment, the second sending/receiving apparatus 4 further includes optical-signal receiving sections 48A and 48B that are provided so as to correspond to the first lane 31 and the second lane 32, respectively, and an optical-signal sending section 49 that is provided so as to correspond to the third lane 33.

The optical-signal sending section 49 includes a light emitting unit, such as an LD, and a driving unit that drives the light emitting unit, such as an LD driver. Each of the optical-signal receiving sections 48A and 48B includes a light receiving unit, such as a PD, and an amplification unit that amplifies an output signal of the light receiving unit.

The link controller 45 controls the optical-signal sending section 49 so that verification information is transmitted using an optical signal having optical power per unit time which is smaller than optical power per unit time in the case of sending link establishment information, e.g., using an optical signal that intermittently emits light, before the link establishment information is sent to the third lane 33. The verification information is information that is used to verify whether or not an optical signal reaches the first sending/receiving apparatus 2 and that is different from the link establishment information. When link establishment information is sent as optical signals from the first sending/receiving apparatus 2 to the second sending/receiving apparatus 4, the link controller 45 controls the optical-signal sending section 49 so that link establishment information and information subsequent thereto are sent using an optical signal that continuously emits light.

Transmission Channel

Regarding the transmission channel 13, optical fibers, a sheet-like optical transmission medium in which multiple cores are covered with a cladding, or the like may be used as an optical cable. Note that an optical-electrical composite cable through which optical signals and electric signals are transmitted may be used as the transmission channel. Also in this case, regarding sides on which optical signals are transmitted, as described above, an optical-signal sending section is provided on the optical-signal sending side, and an optical-signal receiving section is provided on the optical-signal receiving side.

Operation in Second Exemplary Embodiment

Figure 8:
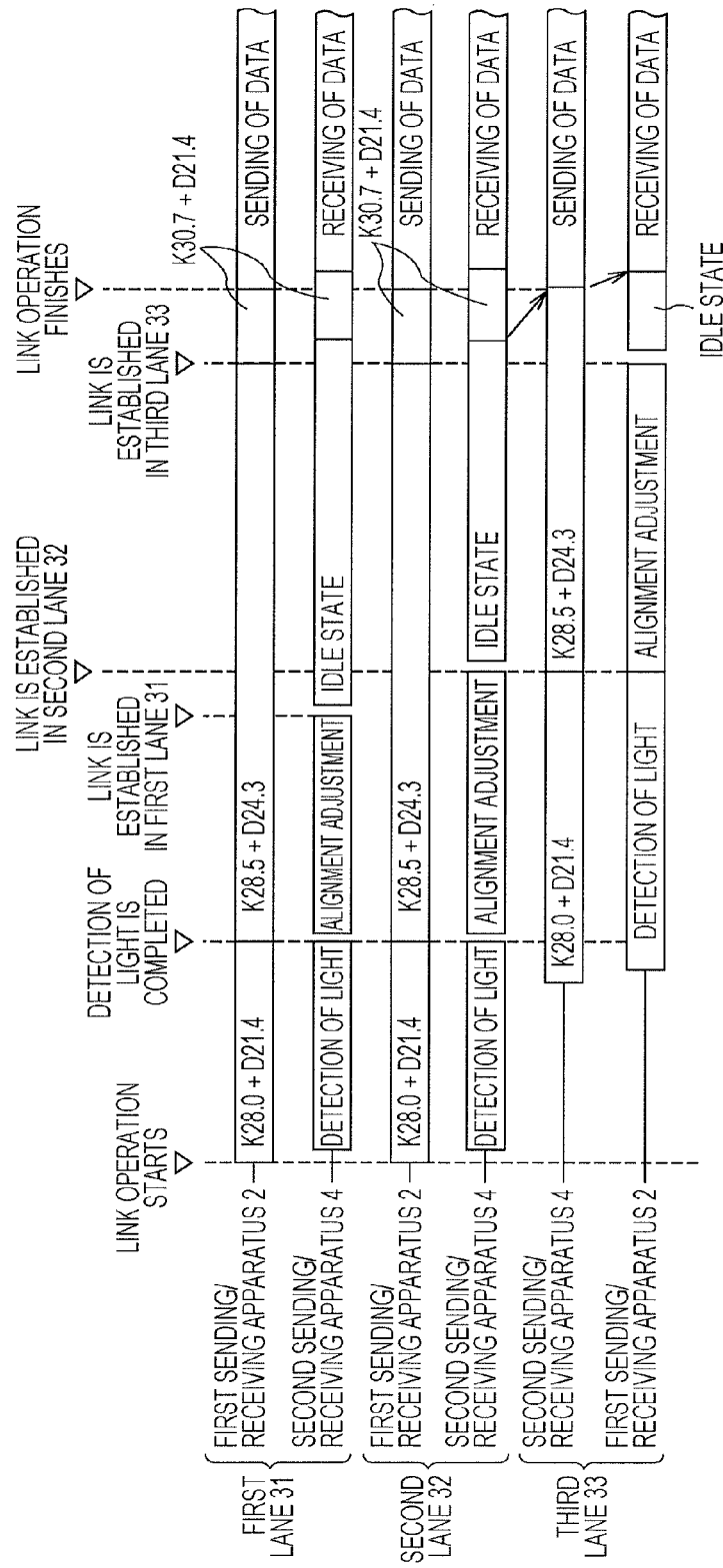
FIG. 8 is a timing chart illustrating an example of an operation of establishing links between first and second sending/receiving apparatuses in the second exemplary embodiment.

An operation in the second exemplary embodiment will be described with reference to FIG. 8. FIG. 8 is a timing chart illustrating an example of an operation of establishing links between the first and second sending/receiving apparatuses in the second exemplary embodiment.

The link controller 23 of the first sending/receiving apparatus 2 controls the optical-signal sending sections 28A and 28B so that verification information, e.g., data represented by K28.0+D21.4, will be sent using optical signals that intermittently emit light. The optical-signal sending sections 28A and 28B repeatedly send the data represented by K28.0+D21.4 to the second sending/receiving apparatus 4 via the first lane 31 and the second lane 32, which correspond to the optical-signal sending sections 28A and 28B, respectively.

When each of the optical-signal receiving sections 48A and 48B of the second sending/receiving apparatus 4 detects the verification information (detection of optical signals is completed), the optical-signal receiving section provides, for the link controller 45, a notification saying that the verification information has been detected. The link controller 45 controls the optical-signal sending section 49 so that verification information, e.g., data represented by K28.0+D21.4, will be sent using an optical signal that intermittently emits light. The optical-signal sending section 49 repeatedly sends the data represented by K28.0+D21.4 to the first sending/receiving apparatus 2 via the third lane 33.

When the optical-signal receiving section 29 of the first sending/receiving apparatus 2 detects the verification information, the optical-signal receiving section 29 provides, for the link controller 23, a notification saying that the verification information has been detected. The link controller 23 instructs the parallel/serial converters 26A and 26B to output link establishment information. Furthermore, the link controller 23 controls the optical-signal sending sections 28A and 28B so that the link establishment information and information subsequent thereto are sent using optical signals that continuously emit light. After that, in the first sending/receiving apparatus 2, the link operation is performed as in the first exemplary embodiment.

Regarding the link controller 45 of the second sending/receiving apparatus 4, the link establishment information has been sent as optical signals from the first sending/receiving apparatus 2 to the second sending/receiving apparatus 4, and the parallel/serial converters 41A and 41B establish links on the basis of the link establishment information. The serial/parallel converters 41A and 41B provide notifications, each of which says that a link has been established, for the link controller 45, and the serial/parallel converters 41A and 41B enter an idle state. When the link controller 45 receives the notifications, each of which says that a link has been established, from both the serial/parallel converters 41A and 41B, the link controller 45 controls the parallel/serial converter 42 and the optical-signal sending section 49 so that link establishment information will be sent using an optical signal that continuously emits light. The optical-signal sending section 49 sends, using an optical signal that continuously emits light, the link establishment information to the first sending/receiving apparatus 2 via the third lane 33. After that, in the second sending/receiving apparatus 4, the link operation is performed as in the first exemplary embodiment.

According to the second exemplary embodiment, before a link is established, verification information is sent using an optical signal that intermittently emits light, and, only after a response to the verification information has been made, be an optical light signal that continuously emits light sent. Accordingly, the optical power per unit time is reduced, and, consequently, the degree of safety is increased, compared with those in the case where high-power laser is continuously output.

Note that, in the second exemplary embodiment, terminals at which a voltage is changed to a high level or a low level in accordance with whether or not an optical-signal sending section and an optical-signal receiving section are connected may be provided, and switching between an optical transmission algorithm and an electrical transmission algorithm may be performed in accordance with whether or not the optical-signal sending section and the optical-signal receiving section are connected.

The exemplary embodiments of the present invention have been described above. However, the present invention is not limited to any one of the exemplary embodiments described above, and various modifications and implementations may be made without departing from the gist of the present invention.

Furthermore, for example, without departing from the gist of the present invention, some of the elements in the individual exemplary embodiments may be omitted, the elements in the individual exemplary embodiments may be used in arbitrary combination, and a step may be added, removed, changed, replaced, or the like in the flows in the individual exemplary embodiments. Moreover, programs used in the above-described exemplary embodiments may be stored in a recording medium, such as a compact disc read-only memory (CD-ROM), and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sending/receiving system comprising:
    a first sending/receiving apparatus that includes:
        a first sending section that serially sends link establishment information via a plurality of first transmission channels, the link establishment information being used to establish a link; and
    a second sending/receiving apparatus that includes:
        a second sending section that serially sends link establishment information to the first sending/receiving apparatus via a second transmission channel, the link establishment information being used to establish a link,
        a plurality of link establishing sections, each of the plurality of link establishing sections being a section that is provided for a corresponding one of the plurality of first transmission channels and that establishes a link in the corresponding first transmission channel based on the link establishment information which has been sent from the first sending section of the first sending/receiving apparatus, and
        a controller that, when links have been established in all of the plurality of first transmission channels by the plurality of link establishing sections, causes the second sending section to send the link establishment information in order to cause the first sending/receiving apparatus to establish a link in the second transmission channel,
    wherein the plurality of first transmission channels and the second transmission channel are optical transmission channels through which optical signals are transmitted,
    wherein the first sending section of the first sending/receiving apparatus includes:
        a plurality of optical-signal sending units that, before the link establishment information is sent, serially send verification information via the plurality of first transmission channels using optical signals having optical power per unit time which is smaller than optical power per unit time in a case of sending the link establishment information, the verification information being used for verification and being different from the link establishment information, and
        an optical-signal receiving unit that receives an optical signal which has been serially sent from the second sending/receiving apparatus via the second transmission channel, and
    wherein the second sending section of the second sending/receiving apparatus includes:
        an optical-signal sending section that, before the link establishment information is sent, serially sends verification information via the second transmission channel using an optical signal having optical power per unit time which is smaller than optical power per unit time in a case of sending the link establishment information, the verification information being used for verification and being different from the link establishment information, and
        a plurality of optical-signal receiving sections that receive optical signals which have been serially sent from the first sending/receiving apparatus via the plurality of first transmission channels.

2. The sending/receiving system according to claim 1, wherein a number of the first transmission channels and a number of the second transmission channels are different from each other.

3. A sending/receiving method comprising:
    serially sending link establishment information from a first sending section of a first sending/receiving apparatus via a plurality of first transmission channels, the link establishment information being used to establish a link;
    serially sending link establishment information from a second sending section of a second sending/receiving apparatus to the first sending/receiving apparatus via a second transmission channel, the link establishment information being used to establish a link;
    establishing a link in each of the plurality of first transmission channels based on the link establishment information which has been sent from the first sending section of the first sending/receiving apparatus; and
    performing, when links have been established in all of the plurality of first transmission channels, control of causing the second sending section to send the link establishment information in order to cause the first sending/receiving apparatus to establish a link in the second transmission channel,
    wherein the plurality of first transmission channels and the second transmission channel are optical transmission channels through which optical signals are transmitted,
    wherein the serially sending link establishment information from the first sending section of the first sending/receiving apparatus includes:
        before the link establishment information is sent, serially sending verification information via the plurality of first transmission channels, by a plurality of optical-signal sending units, using optical signals having optical power per unit time which is smaller than optical power per unit time in a case of sending the link establishment information, the verification information being used for verification and being different from the link establishment information, and
        receiving an optical signal, by an optical-signal receiving unit, which has been serially sent from the second sending/receiving apparatus via the second transmission channel, and
    wherein the serially sending link establishment information from the second sending section of the second sending/receiving apparatus includes:
        before the link establishment information is sent, serially sending verification information via the second transmission channel, by an optical-signal sending section, using an optical signal having optical power per unit time which is smaller than optical power per unit time in a case of sending the link establishment information, the verification information being used for verification and being different from the link establishment information, and
        receiving optical signals, by a plurality of optical-signal receiving sections, which have been serially sent from the first sending/receiving apparatus via the plurality of first transmission channels.

4. A non-transitory computer-readable medium storing a program causing a computer to execute a process, the process comprising:
    serially sending link establishment information from a first sending section of a first sending/receiving apparatus via a plurality of first transmission channels, the link establishment information being used to establish a link;
    serially sending link establishment information from a second sending section of a second sending/receiving apparatus to the first sending/receiving apparatus via a second transmission channel, the link establishment information being used to establish a link;

establishing a link in each of the plurality of first transmission channels based on the link establishment information which has been sent from the first sending section of the first sending/receiving apparatus; and performing, when links have been established in all of the plurality of first transmission channels, control of causing the second sending section to send the link establishment information in order to cause the first sending/receiving apparatus to establish a link in the second transmission channel, wherein the plurality of first transmission channels and the second transmission channel are optical transmission channels through which optical signals are transmitted, wherein the serially sending link establishment information from the first sending section of the first sending/receiving apparatus includes:

before the link establishment information is sent, serially sending verification information via the plurality of first transmission channels, by a plurality of optical-signal sending units, using optical signals having optical power per unit time which is smaller than optical power per unit time in a case of sending the link establishment information, the verification information being used for verification and being different from the link establishment information, and receiving an optical signal, by an optical-signal receiving unit, which has been serially sent from the second sending/receiving apparatus via the second transmission channel, and wherein the serially sending link establishment information from the second sending section of the second sending/receiving apparatus includes:

before the link establishment information is sent, serially sending verification information via the second transmission channel, by an optical-signal sending section, using an optical signal having optical power per unit time which is smaller than optical power per unit time in a case of sending the link establishment information, the verification information being used for verification and being different from the link establishment information, and receiving optical signals, by a plurality of optical-signal receiving sections, which have been serially sent from the first sending/receiving apparatus via the plurality of first transmission channels.

* * * * *